United States Patent

Niwa et al.

Patent Number: 5,466,483
Date of Patent: Nov. 14, 1995

[54] METHOD FOR PRODUCING A SILICA MASK ON METAL OXIDE SURFACE

[75] Inventors: Miki Niwa, Nishi 4-chome 110, Koyama-cho, Tottori, 680; Nobuaki Kodakari, Tottori; Hisato Funabiki, Himeji; Naonobu Katada, Tottori, all of Japan

[73] Assignees: Miki Niwa, Tottori; Figaro Engineering Inc., Osaka, both of Japan

[21] Appl. No.: 260,986

[22] Filed: Jun. 15, 1994

[30] Foreign Application Priority Data

Feb. 4, 1994 [JP] Japan .................................. 6-032892

[51] Int. Cl.⁶ .................................................. B05D 3/02
[52] U.S. Cl. ...................... 427/226; 427/248; 427/256; 427/272; 427/273; 427/282
[58] Field of Search ................ 427/226, 248.1, 427/256, 272, 273, 282

[56] References Cited

U.S. PATENT DOCUMENTS

| | | | |
|---|---|---|---|
| 3,592,707 | 7/1971 | Jaccodine | 156/17 |
| 3,880,675 | 4/1975 | Tarui et al. | 148/1.5 |
| 3,964,906 | 6/1976 | Kenney | 96/33 |
| 4,041,190 | 8/1977 | Dubois et al. | 427/95 |
| 4,053,351 | 10/1977 | De Forest et al. | 156/661 |
| 4,332,837 | 6/1982 | Peyre-Lavigne | 427/99 |

OTHER PUBLICATIONS

Niwa et al., *Applied Catalysis*, "Benzaldehyde–amminia titration method for discrimination between surfaces of metal oxide catalysts", 67 (1991) pp. 297–305.

The Proceeding of 72th Catalyst Conference (A), Sep. 28–30, 1993.

*Primary Examiner*—Benjamin Utech
*Attorney, Agent, or Firm*—Nikaido Marmelstein Murray & Oram

[57] ABSTRACT

A method for producing a silica mask on metal oxide surface is disclosed. Benzaldehyde is adsorbed on neutral or weak alkaline metal oxide surface, and then tetra-methoxy silane is deposited. The tetra-methoxy silane is hydrolyzed by water vapor into silica and the adsorbed benzaldehyde is removed by NH3 as benzo-nitrile. Thus a silica mask is produced on the metal oxide surface, and the mask has vacancies corresponding to the removed benzaldehyde. The vacancies act as the adsorption sites for shape selective adsorption.

7 Claims, 14 Drawing Sheets

METHOD FOR PRODUCING A SILICA MASK ON METAL OXIDE SURFACE

FIELD OF THE INVENTION

The present invention relates to a method for producing a silica mask on metal oxide surface and more particularly to a method for producing a silica mask having vacancies of specific sizes on metal oxide surface and controlling the sizes of the adsorption sites. Metal oxides provided with the silica masks are adapted to shape selective adsorption and usable as catalysts, adsorbents, and such sensors as gas sensors and biosensors.

PRIOR ART

Zeolite compounds are well known as shape selective adsorbents. They selectively adsorb specific molecules by controlling their pore diameters. They have been used for separating specific molecules from molecule mixtures and also used as selective catalysts. However, since they select molecules with their pores, desorption of the adsorbed molecules is not easy and requires such treatment as pressure-swing. In place of sieving molecules with the pores of zeolite compounds, the present inventors have investigated to produce masks on metal oxide surface for shape specific adsorption.

SUMMARY OF THE INVENTION

The object of the present invention is to provide a method for producing a shape selective mask on a metal oxide surface for shape specific adsorption. Metal oxides with such masks do not need pressure swing for desorption. Such masked metal oxides are applicable to gas sensors, biosensors, or the like in which only the materials to be detected are selectively adsorbed on the metal oxides through the mask. They are also applicable to use as catalysts and molecular separators in a gas or a liquid phase.

According to the invention, acidic molecules are adsorbed on a neutral or alkaline metal oxide surface at a desired density of less than that of a monomolecular surface layer, then precursor molecules of silica are deposited on the surface between the adsorbed acid molecules. The adsorbed acidic molecules are then removed, and the deposited silica molecules are decomposed into silica. Thus a silica mask is produced on the metal oxide surface.

Preferably, the above process is done in the gas phase in which control of the process is easy. However, it can be done in the liquid phase by using appropriate solvents. Neutral or weak alkaline metal oxides such as $Al_2O_3$, $SnO_2$, $TiO_2$, $ZrO_2$, and $MgO$ are preferable. Alkoxy silane compounds are preferable as the precursor molecules of silica as they are easily combined onto the metal oxide surface through M—O—Si bonds and easily decomposed into silica. Here, M represents a metal atom, O represents an oxygen atom, and Si represents a silicon atom. Typical alkoxy silanes are tetra-methoxy silane, tetra-ethoxy silane, and tetra-butoxy silane. Such silane compounds as mono-silane and di-silane or various organosilicic compounds may also be used as the precursors. The silica precursor molecules deposited are combined onto the metal oxide surface through the M—O—Si bonds, then they are hydrolyzed by water vapor into silica for the most part. Hydrolysis by water vapor proceeds easily with alkoxy silane compounds, wherein the alkyl groups are removed and silica is produced.

While the acidic molecules adsorbed may be removed by thermal decomposition, it is desirable to remove them by the reaction with alkaline substances, since then they will be removed at relatively low temperature. Alkaline compounds such as $NH_3$ and amines are preferable, because they leave no impurities on the surface. Sizes of the adsorption sites formed by removing the acidic molecules are determined by their molecular diameters, and those of adequate diameters are preferable. Acidic aromatic compounds, especially aromatic carboxylic acids and aromatic aldehydes are preferable. According to the process of the invention, it is indispensable to first adsorb the acidic molecules on the metal oxide surface and then to deposit the silica precursor molecules on the surface before the acidic molecules are removed. There is no particular order that is preferred between decomposition of the silica precursor into silica and removal of the acidic molecules. For example, those two steps may be done simultaneously by thermally decomposing the acidic molecules and the silica precursor.

A method for producing a silica mask on the metal oxide surface is described in the following. After the acidic molecules are adsorbed on a neutral or weakly alkaline metal oxide surface, the precursor molecules of silica are deposited. The precursor molecules do not attach onto the acidic molecules but are deposited on portion of the metal oxide surface not already occupied by the acidic molecules, since the precursor molecules are generally acidic. Of course the acidic molecules are to be adsorbed so as to produce a surface density thereof which corresponds to the molecules which will later be adsorbed on the masked metal oxide. The deposited precursor silica molecules are then combined onto the metal oxide surface by way of M—O—Si bonds and therefore they do not move on the surface. The silica precursor is hydrolyzed then partially by water vapor or the like, and the acidic molecules are removed by the reaction thereof with alkaline compounds such as $NH_3$ or amines. There remains a mask of silica precursor which has been mostly hydrolyzed into silica on the surface, which is to be decomposed into a silica mask.

Accordingly, the removal of the acid moieties on the metal oxide surface generates openings in the mask on the metal oxide surface. These openings are usable as the adsorption sites for shape selective adsorption. Sizes of the sites are determined by the sizes (molecular diameters) of the acidic molecules. The acidic molecules behave as a template to control the deposition sites of the silica mask and the silica mask behaves, after the acid molecules have been removed as a stencil for shape selective adsorption.

BRIEF DESCRIPTION OF THE DRAWINGS

FIG. 7 is a characteristic diagram showing relative sensitivity of the $SnO_2$ gas sensor with the silica mask for benzene, toluene, ethyl-benzene, cumene, ortho xylene, meta xylene, para xylene, mesitylene, and 1,3,5-tri isopropyl benzene (1,3,5-TIPB), wherein the sensitivity is normalized by that of the gas sensor without the mask.

EMBODIMENT

FIGS. 1–17 show an embodiment of this invention. $SnO_2$ was used as an example of metal oxides, and both adsorption measurement and electric conductivity measurement were done. $SnO_2$ is neutral or weakly alkaline and is usable as a catalyst and as a gas sensor. In place of $SnO_2$, other typical gas sensor materials such as $TiO_2$ and $ZrO_2$ may be used. Other metal oxides which are typical for use as catalysts such as $Al_2O_3$ and MgO may also be usable. They are all neutral or weakly alkaline.

$SnCl_2 \cdot 2H_2O$ was dissolved in dilute hydrochloric acid and was hydrolyzed by $NH_3$ water into a $Sn(OH)_2$ precipitate. Then the precipitate was dried for 24 hrs. at 110° C. and was baked at 500° C. for 2 hrs. in air. The resultant $SnO_2$ was pulverized and that of 30–50 mesh was used. 0.2 g of $SnO_2$ was used for each adsorption measurement.

Figure 1:
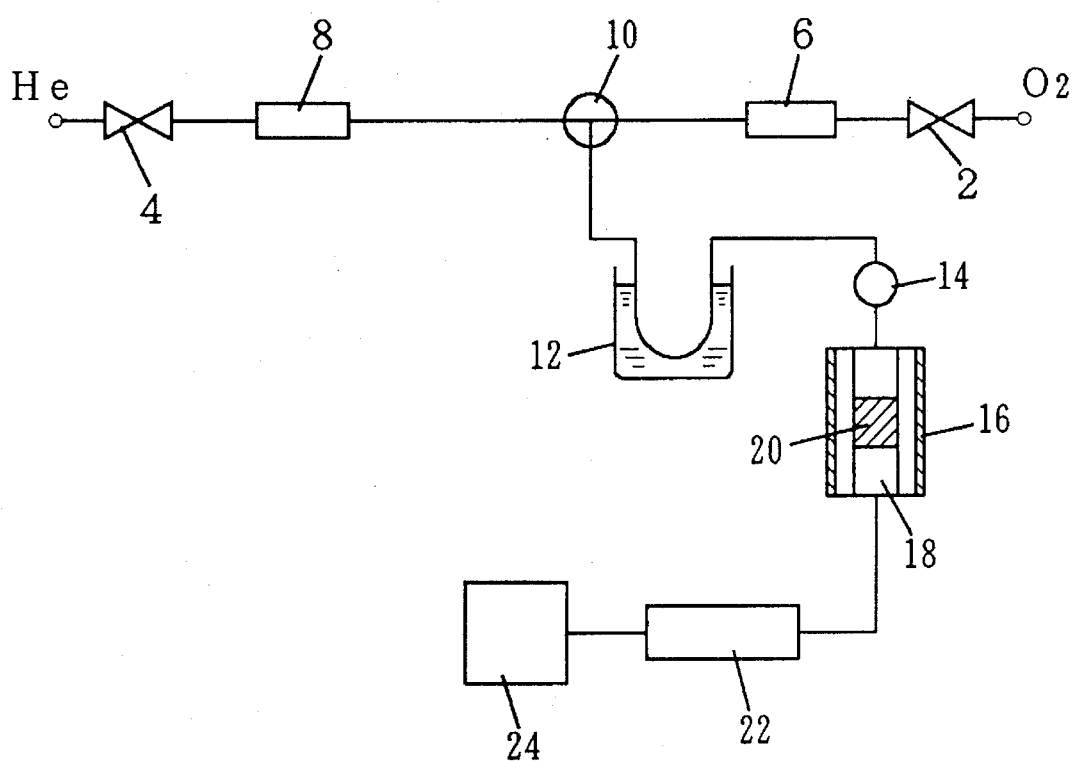
FIG. 1 shows the apparatus for producing silica masks used in the embodiment.

Silica masks were prepared on the $SnO_2$ surface with an apparatus shown in FIG. 1, where indicated at 2 is a valve connected to an oxygen source, indicated at 4 is a valve connected to a He source, 6 and 8 represent flow meters which permit $O_2$ and He flow at a predetermined rate, 10 denotes a three way valve for changing the flow from $O_2$ to He, 12 denotes a liquid nitrogen trap for removing impurities, 14 denotes an inlet for injecting benzaldehyde, tetramethoxy silane (TMOS), and water vapor, 16 denotes an electric furnace, 18 denotes a glass reactor, and 20 denotes an $SnO_2$ specimen.

For measuring the adsorption and desorption amounts of benzaldehyde, the reactor 18 was connected to a flame ionization gas-chromatograph, and indicated at 22 is its column, indicated at 24 is an FID (flame ionization detector). For measuring the amounts of benzaldehyde which were absorbed, a predetermined amount of benzaldehyde was injected through the inlet 14, and the benzaldehyde which passed through the reactor 18 was measured with the FID 24. Likewise, benzonitrile was determined with the FID 24 when benzaldehyde was desorbed as benzonitrile its the reaction with $NH_3$. The deposition amounts of TMOS were measured in a similar manner.

Figure 2:
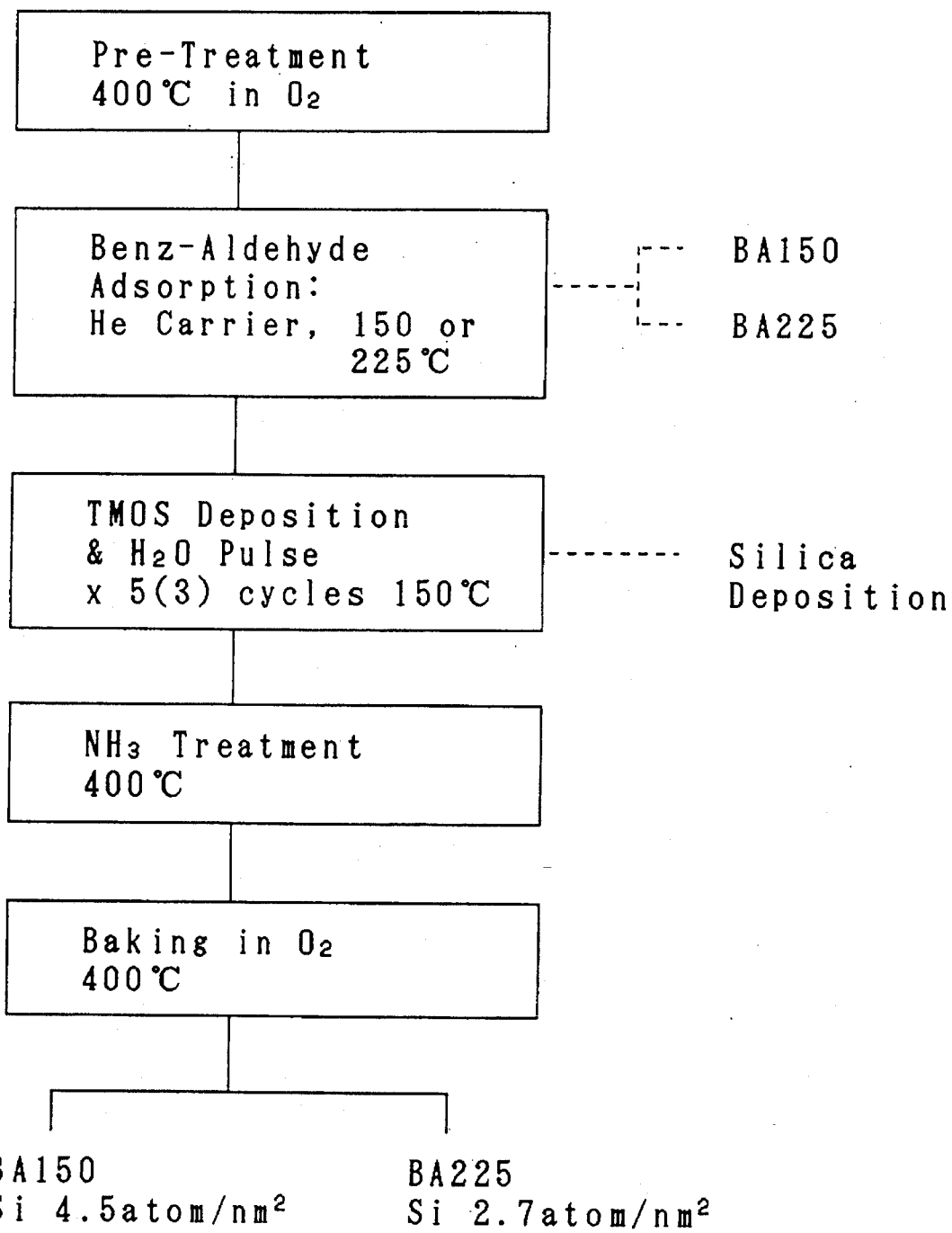
FIG. 2 is a flow chart for the silica mask production.

Steps for the production of the silica masks are shown in FIG. 2. As a pre-treatment, $SnO_2$ was heated at 400° C. in an electric furnace under a flow of $O_2$ at a rate of 50 ml/minute. Then the flow was replaced with that of He at the same rate, and benzaldehyde was adsorbed on $SnO_2$ at 150° C. or 225° C. until the became saturated and a mask of benzaldehyde was produced. The above adsorption process was done by repeatedly injecting 1 µl increments of liquid benzaldehyde until no further adsorption occurred. Usually the injection was repeated 4 or 5 times. The adsorption amounts were less than that of the unimolecular adsorption.

Benzaldehyde (BA) molecules are oxidized to benzoate anions and strongly adsorbed on $SnO_2$. This adsorption is accompanied by an acid-base reaction, and the benzaldehyde adsorbed was not removed by the later applied tetramethoxy silane or water vapor. Tetra-methoxy silane (TMOS) was introduced into the He carrier and was deposited on the $SnO_2$ surface. TMOS was repeatedly injected by 1 µl increments until no further deposition occurred. Usually TMOS was injected 7 or 8 times. Deposited TMOS was partially hydrolyzed by its reaction with the surface hydroxyl groups of $SnO_2$ and combined onto the $SnO_2$ surface through Sn—O—Si bonds. Then the deposited TMOS was further hydrolyzed by introducing water vapor into the system. Remaining alkoxide groups of TMOS were for the most part removed by reaction with the water vapor.

A cycle of deposition of TMOS and its hydrolysis by water vapor was conducted once, three times or five times. In the electric conductivity measurement, this cycle was repeated three times. TMOS does not attach onto pre-adsorbed benzaldehyde (BA) since it is acidic. Thus TMOS is deposited only on areas of the $SnO_2$ surface not previously occupied with benzaldehyde (BA). The same results may be obtained when tetraethoxy silane or tetra-butoxy silane are used in place of TMOS. Simpler silane compounds such as mono-silane and disilane or various organosilicic compounds may also be used in place of TMOS, while alkoxy silanes are easier to be hydrolyzed at relatively low temperature.

Then $NH_3$ was introduced into the He carrier, and benzoate anions were removed by reaction with $NH_3$ at 400° C. Desorption was almost complete and the desorption product was benzo-nitrile. After removing benzoate anions, the flow of $NH_3$ was replaced with $O_2$ and the specimens were baked at 400° C. for 1 hour for completely oxidizing residual methoxyl groups of TMOS. Thus the silica mask was produced. Other acidic molecules may be usable in place of benzaldehyde. Aromatic carboxylic acids and aromatic aldehydes are preferable. By using molecules of different diameters the, sizes of adsorption sites on the $SnO_2$ surface may be controlled.

Figure 3:
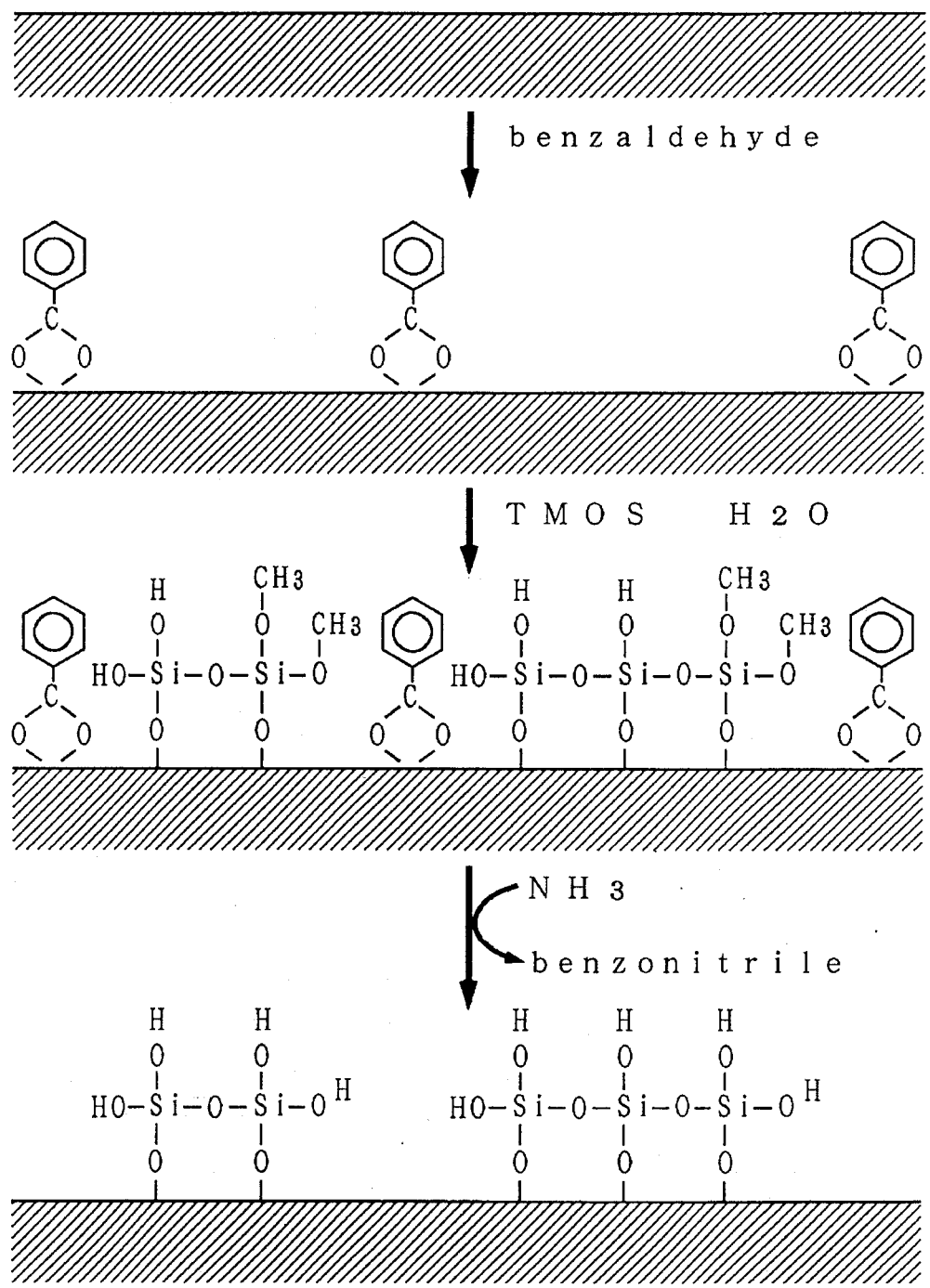
FIG. 3 illustrates benzaldehyde adsorption, deposition of TMOS and its hydrolysis by water, and removal of adsorbed benzaldehyde.

FIG. 3 illustrates the production mechanism of the silica mask. Benzaldehyde molecules adsorbed on the $SnO_2$ surface change into benzoate anions, and TMOS molecules introduced to the system are deposited onto areas of in the $SnO_2$ surface not occupied by benzaldehyde. TMOS molecules are partially hydrolyzed and combined onto the surface through Sn—O—Si bonds. TMOS molecules are then further hydrolyzed by injecting water vapor and most of their methoxyl groups are decomposed into the OH groups. Benzoate anions are removed as benzonitrile by the reaction with $NH_3$. The remaining methoxyl groups are completely removed by thermal decomposition in $O_2$, etc. and the product is a silica mask on the $SnO_2$ surface. The mask has many holes due to the desorption of benzoate anions, and diameter of these holes is determined by the size of benzoate benzoate anions.

Specimens onto which benzaldehyde is adsorbed at 150° C. are referred to as "BA150", and those at 225° C. are referred to as "BA225". The deposition density of Si on the BA150 treated $SnO_2$ surface was 4.5 Si atoms/$nm^2$ and that on the BA225 treated $SnO_2$ was 2.7 Si atoms/$nm^2$, where deposition of TMOS and water vapor injection were repeated 5 times. The deposition density of Si in a specimen without a benzaldehyde mask absorbed as a unimolecular layer was about 10 Si atoms/$nm^2$. After removal of the benzaldehyde, 50–70% of the surfaces of BA150 and BA225 is exposed between the silica coverage and is therefor adapted to be adsorption sites, while rest of the surfaces is covered with silica.

Figure 4:
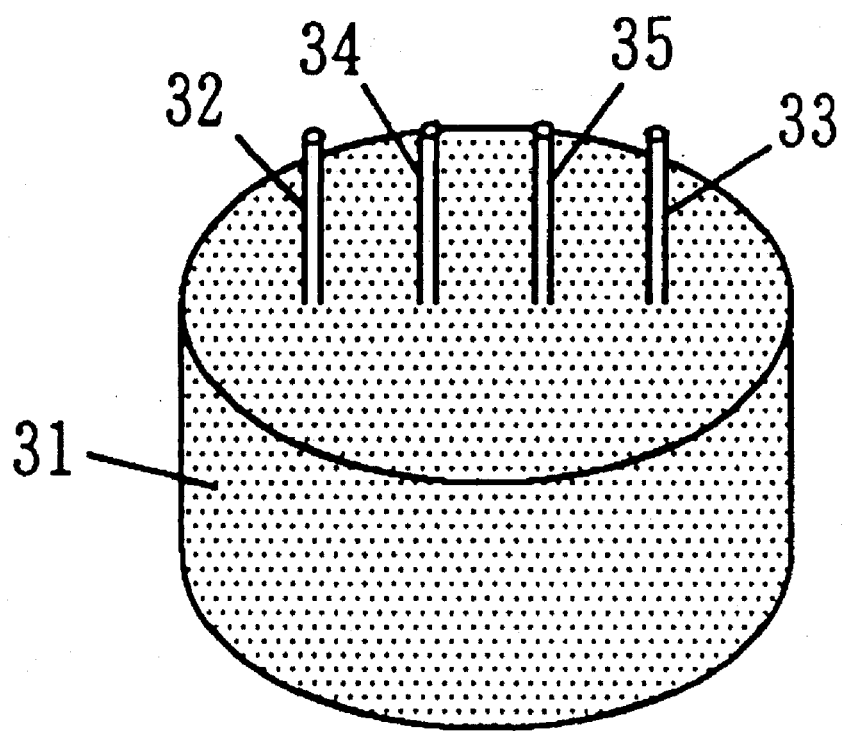
FIG. 4 is a perspective showing the $SnO_2$ gas sensor used in the embodiment.

FIG. 4 shows an $SnO_2$ gas sensor 30 with the silica mask used for electric conductivity measurement. Since $SnO_2$ is suitable to electric conductivity measurement and is therefor applicable as a gas sensor material, $SnO_2$ 31 having a silica mask thereon was shaped into a disk like body with four electrodes 32, 33, 34 and 35 embedded therein and baked at 400° C. to produce the gas sensor 30. In the measurement, DC 90 V was applied between the two outer electrodes 32 and 33, and the resistance between the two inner electrodes 34 and 35 was measured to evaluate the characteristics of the gas sensor 30.

Figure 5:
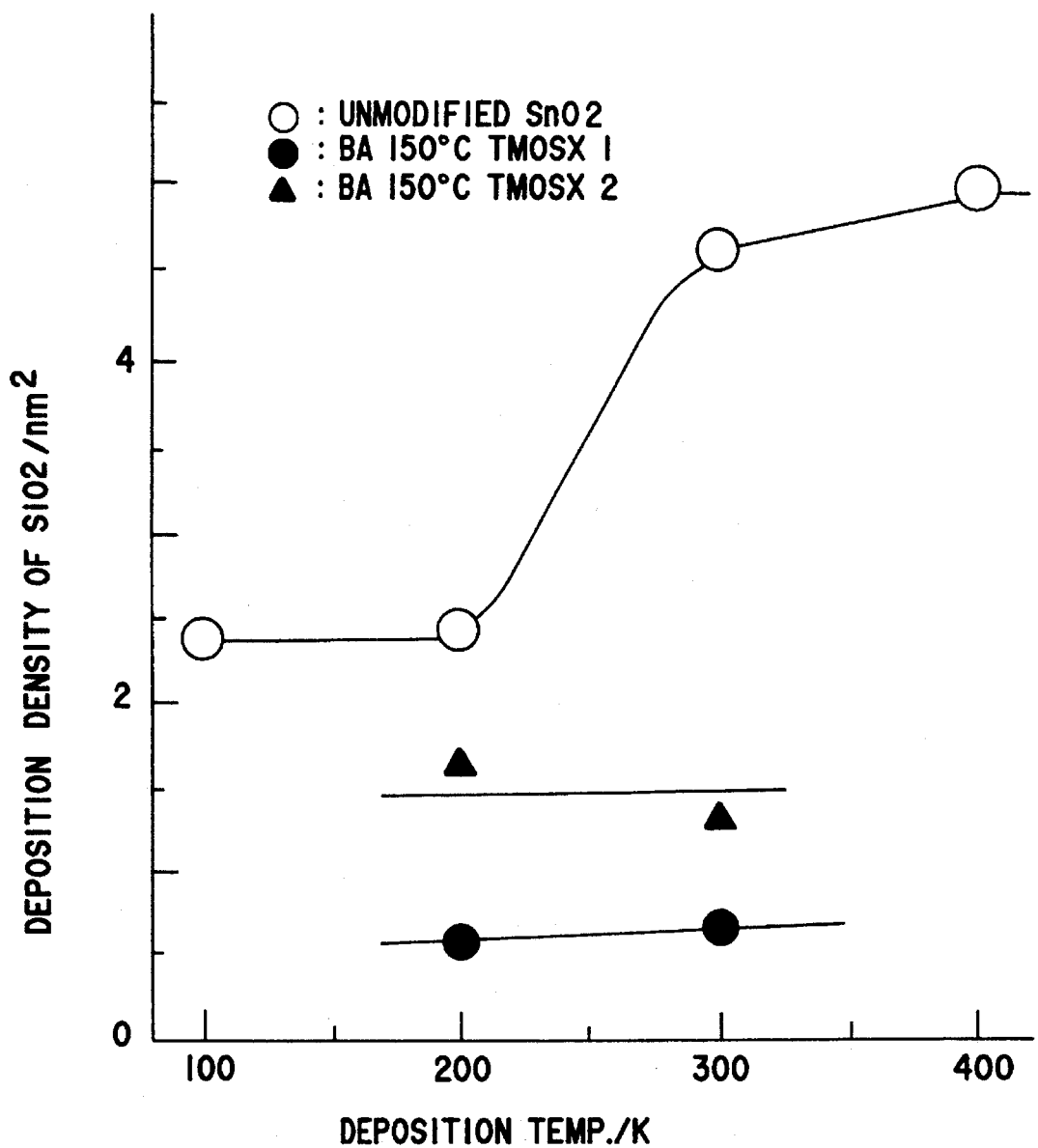
FIG. 5 is a characteristic diagram showing the silica deposition density on $SnO_2$ with and without benzaldehyde pre-adsorbed.

FIG. 5 shows the deposition amounts of TMOS on the specimens with and without pre-adsorption of benzaldehyde. The deposition density of TMOS was decreased with benzaldehyde pre-adsorption while it was increased by repeating deposition. Decrease in TMOS deposition amount with benzaldehyde pre-adsorption shows that TMOS is not deposited on benzaldehyde. This is because benzaldehyde is adsorbed on $SnO_2$ as a benzoate anion and it has little affinity for TMOS because TMOS is acidic. The deposition density of TMOS on the $SnO_2$ surface corresponding to its deposition as a molecular layer was 10 $nm^{-2}$, and when TMOS is deposited only once or twice, density of the resultant silica mask is too low to control shape selective adsorption. Therefore TMOS was deposited usually 5 times.

Figure 6:
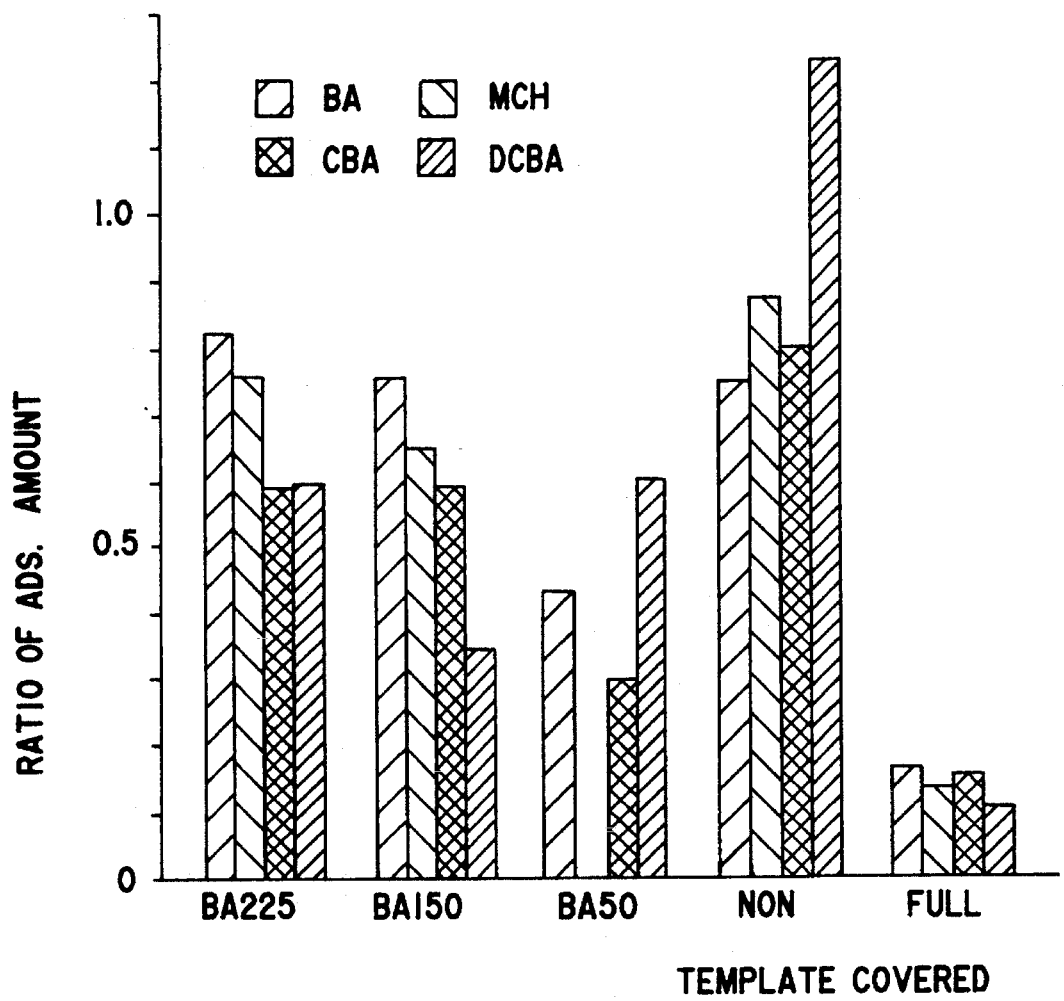
FIG. 6 is a characteristic diagram showing the adsorption density of various gases on $SnO_2$ surface with the silica mask, where BA represents benzaldehyde, MCH represents 2-methyl cyclo hexanol, CBA represents ortho-chloro benzaldehyde, and DCBA represents 2,6-dichloro benzaldehyde.

FIG. 6 shows relative adsorption amount of various gases on the $SnO_2$ surface with and without the silica mask. The ordinate shows ratio of adsorption amount in arbitrary units. Specimen BA225 is the one where TMOS was deposited after benzaldehyde is adsorbed at 225° C. Similarly BA150 and BA50 are the specimens where benzaldehyde was pre-adsorbed at 150° C. and 50° C. respectively. "Non-Template" refers to the specimen without pre-adsorption of benzaldehyde in which case the silica was deposited at about the same density as that of BA150. "Full-Covered" refers to the specimen where silica was deposited at the density of its monomolecular layer on the $SnO_2$ surface without any pre-adsorption. With respect to BA225 and BA150, the adsorption order of benzaldehyde (BA), 2-methyl cyclo hexanol (MCH), ortho-chloro benzaldehyde (CBA), and 2,6-dichloro benzaldehyde (DCBA) appears, which is the inverse order to that of "Non-Template". Adsorption order in BA150, in particular, shows a clear inverse proportion to the molecular diameters of those gases.

Figure 7:
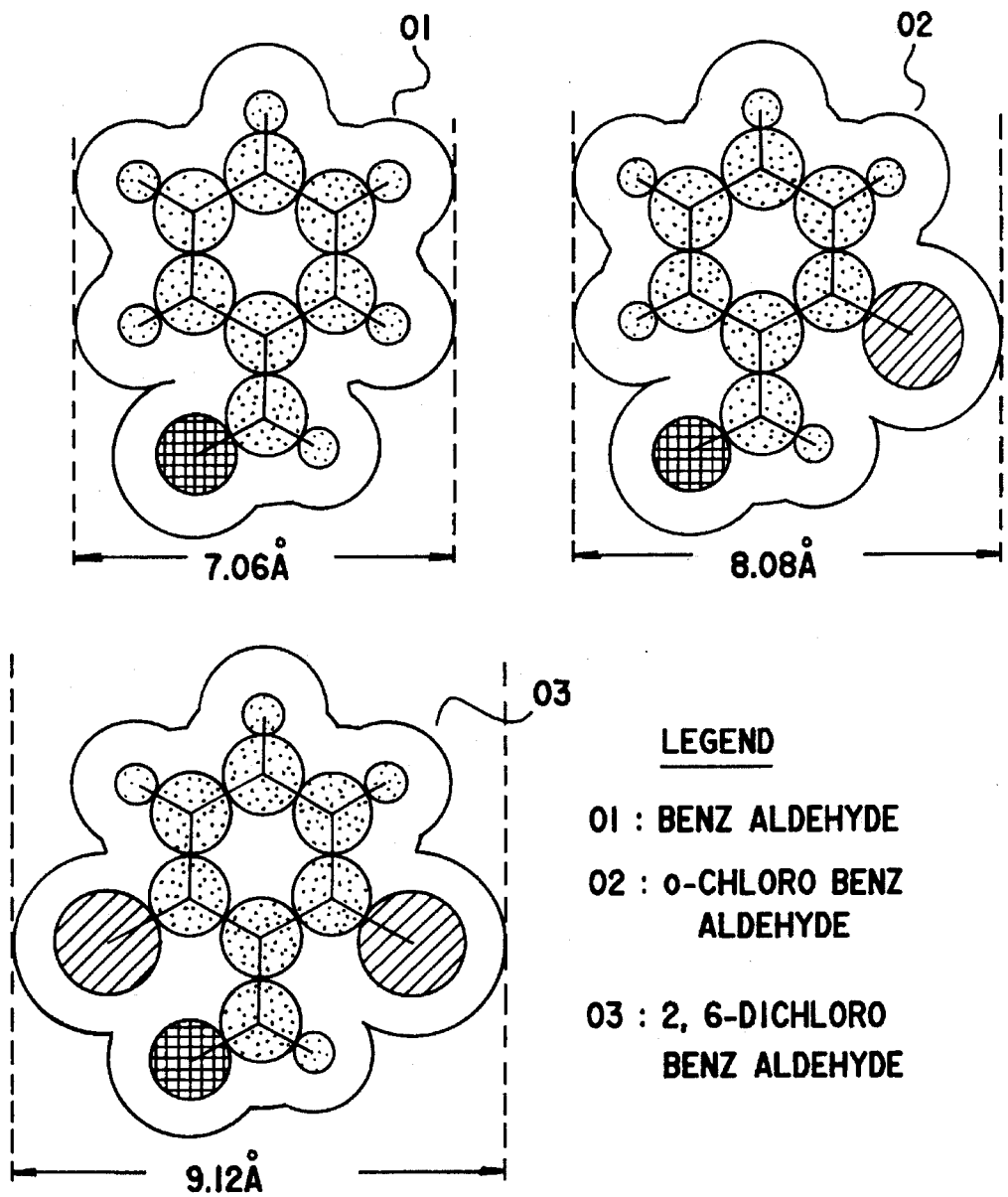
FIG. 7 is a characteristic diagram showing molecular sizes of BA, CBA, and DCBA.

FIG. 7 shows molecular diameters of BA, CBA, and DCBA. They are homologous compounds and their molecular diameters increase with the addition of chlorine atom. The adsorption site size in the silica mask corresponds to the diameter of benzaldehyde, and the adsorption density of DCBA of large molecular diameter is decreased with the silica mask as is shown in FIG. 6.

Figure 8:
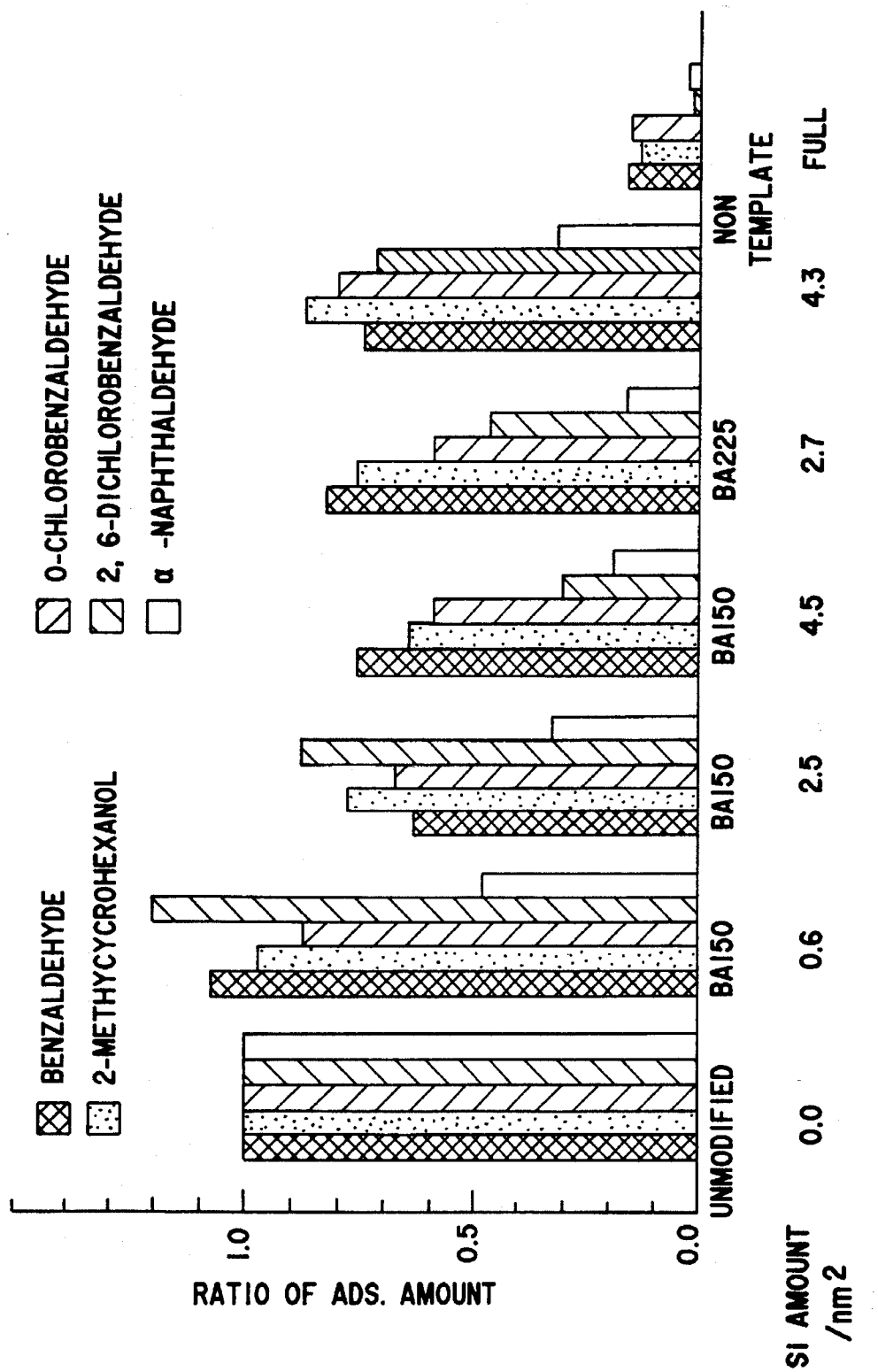
FIG. 8 is a characteristic diagram showing the relation between the adsorption density of BA, MCH, CBA, DCBA, α-naphthaldehyde and the silica deposition density on $SnO_2$ surface, wherein the adsorption density of the gases is normalized by that on the $SnO_2$ surface without the silica mask.

FIG. 8 shows the relation between the adsorption amount of various gases and the density of the silica mask. The adsorption amount is normalized by that on unmodified $SnO_2$, so that the relation between the adsorption amount and silica deposition density is illustrated. With respect to BA150 series, the adsorption density of relatively large molecules decreased in inverse proportion to silica density. Similarly, with respect to BA225, the silica mask blocked the adsorption of the large molecules.

FIGS. 9–14 shows the electrical resistance change of the $SnO_2$ gas sensor 30 upon its contact with various gases. $SnO_2$ was, after benzaldehyde pre-adsorption at 150° C., treated with TMOS deposition and water vapor injection three times respectively at 150° C. Then benzaldehyde was removed by $NH_3$, and $SnO_2$ was heated at 400 C. in $O_2$ for 1 hour so that TMOS was completely decomposed into silica. The solid lines show the characteristics of the specimen with the silica mask, while the broken lines show those without the silica mask. The ordinates show resistance normalized by the resistance Ro before the contact with the gases. The abscissas show the time after the contact with the gases. The gas sensor 30 was heated at 270° C. under the flow of air of 40 ml/minute. Liquid corresponding to each gas was injected aliquots of 0.5 μl at a time.

Figure 9:
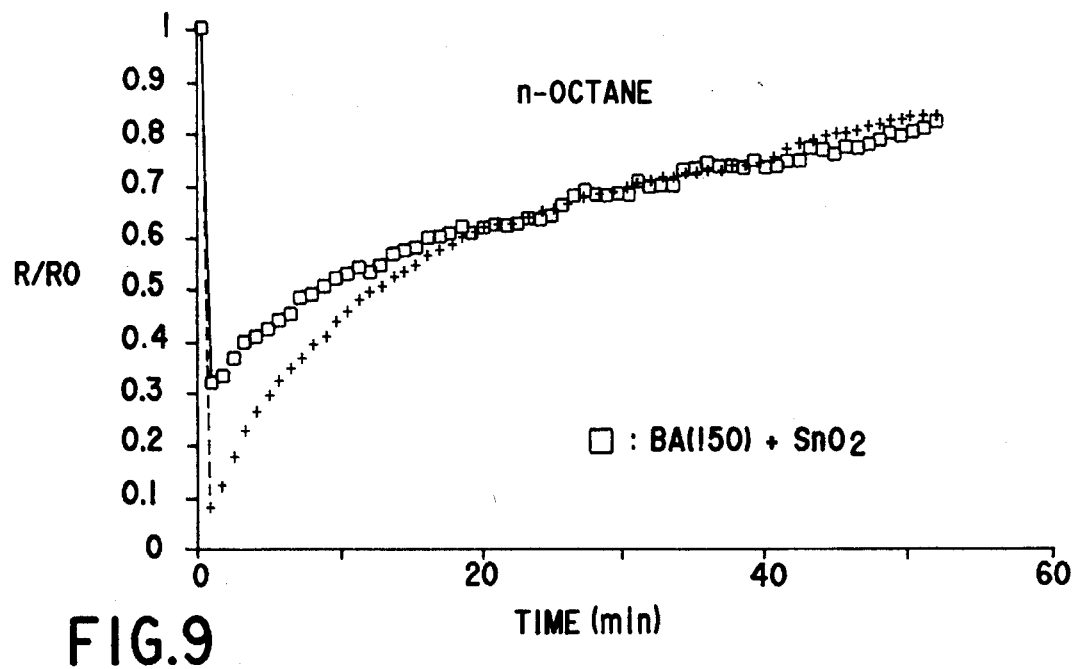
FIG. 9 is a characteristic diagram the change in the resistance of the $SnO_2$ gas sensor at 270° C. for n-octane, wherein the resistance is normalized by the one before the contact with the gas, and the solid line shows the characteristics of the gas sensor with the silica mask and the broken line shows those of the gas sensor without the silica mask.
Figure 10:
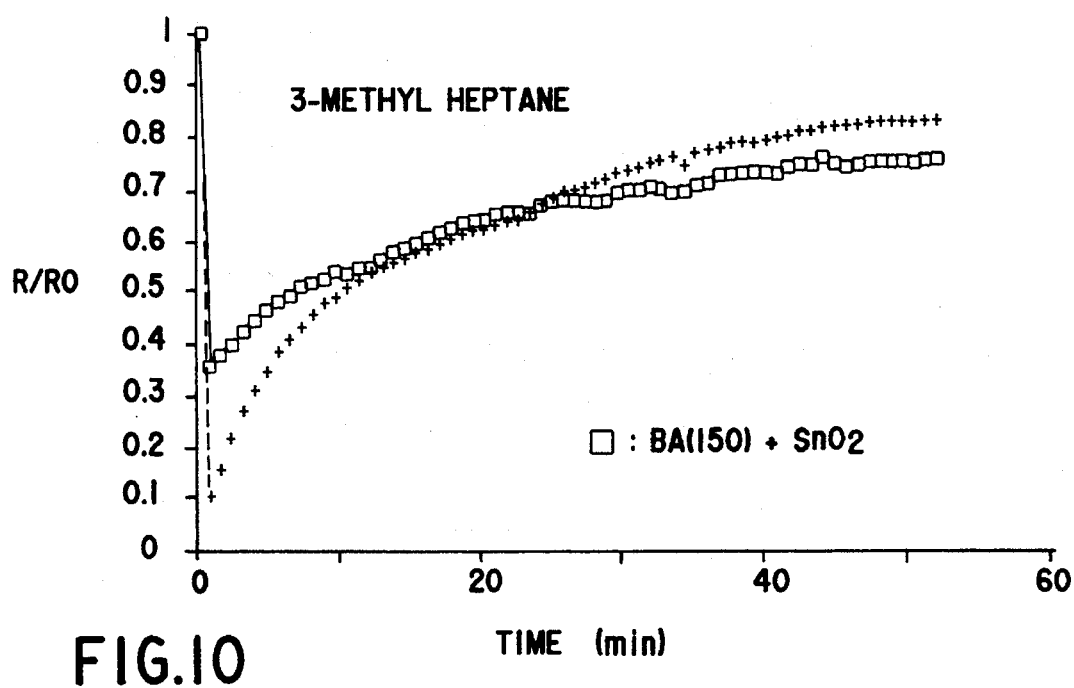
FIG. 10 is a characteristic diagram showing resistance change of the $SnO_2$ gas sensor for 2-methyl heptane.
Figure 11:
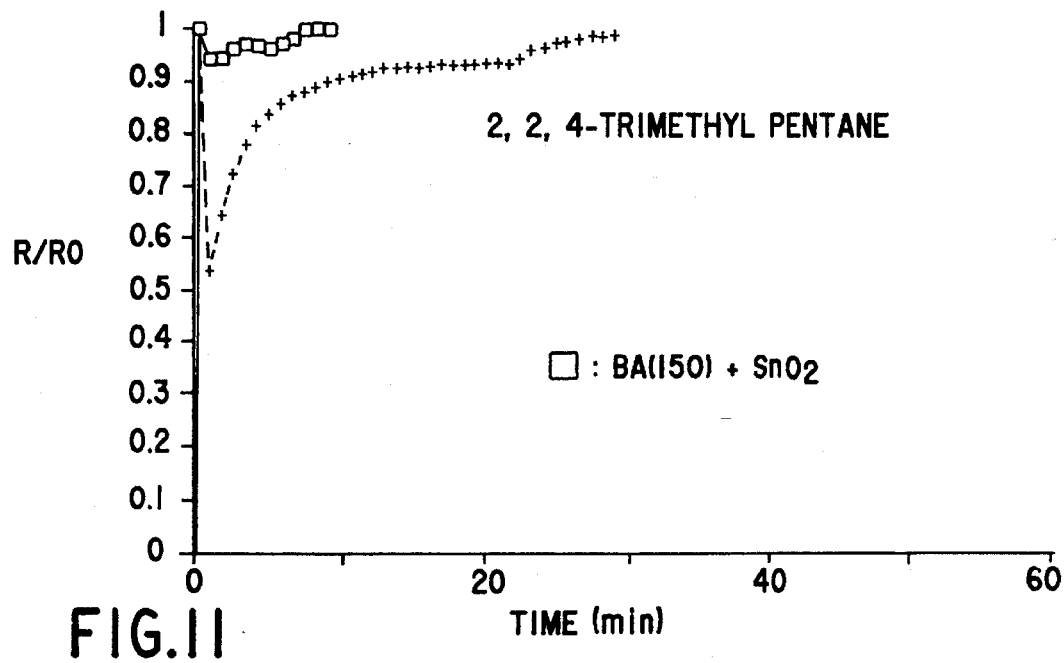
FIG. 11 is a characteristic diagram showing resistance change of the $SnO_2$ gas sensor for 2,2,4-trimethyl pentane.

FIGS. 9–11 show selectivity of the silica mask toward octane isomers. While the influence of the silica mask on normal-octane (FIG. 9) and 3-methyl heptane (FIG. 10) was small, the resistance change for 2,2,4-tri methyl pentane (FIG. 11) was remarkably decreased with the silica mask. These results reveal that while straight-chain hydrocarbons or hydrocarbons with a small side chain may be adsorbed on $SnO_2$ through the silica mask, sphere shaped hydrocarbons with large side chains are blocked by the silica mask.

Figure 12:
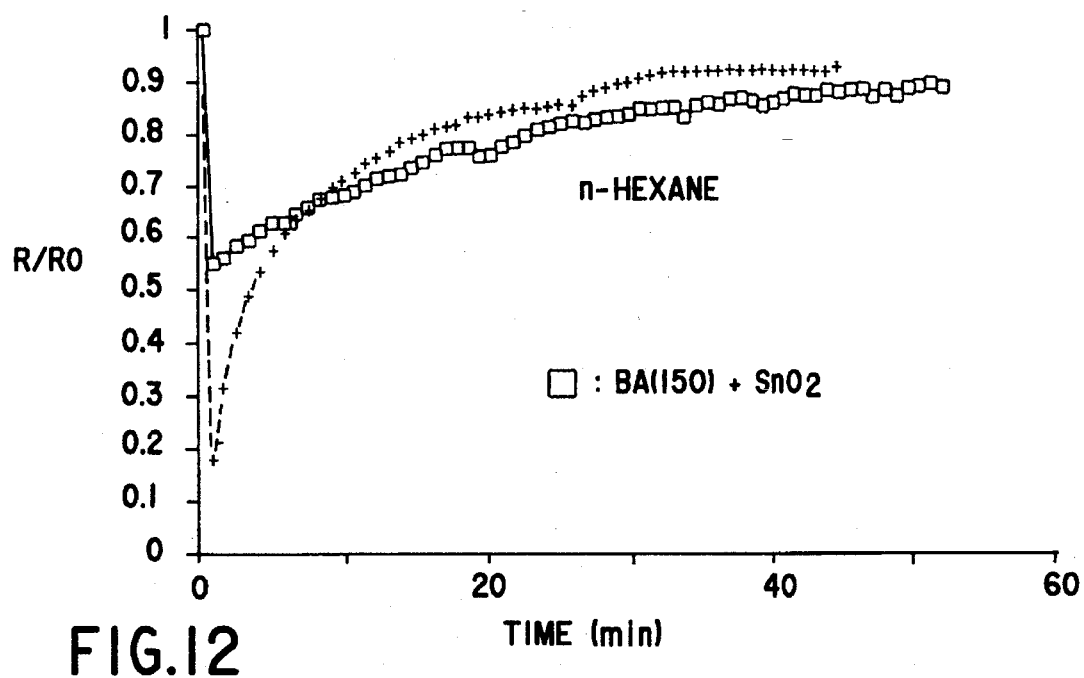
FIG. 12 is a characteristic diagram showing resistance change of the $SnO_2$ gas sensor for n-hexane.
Figure 13:
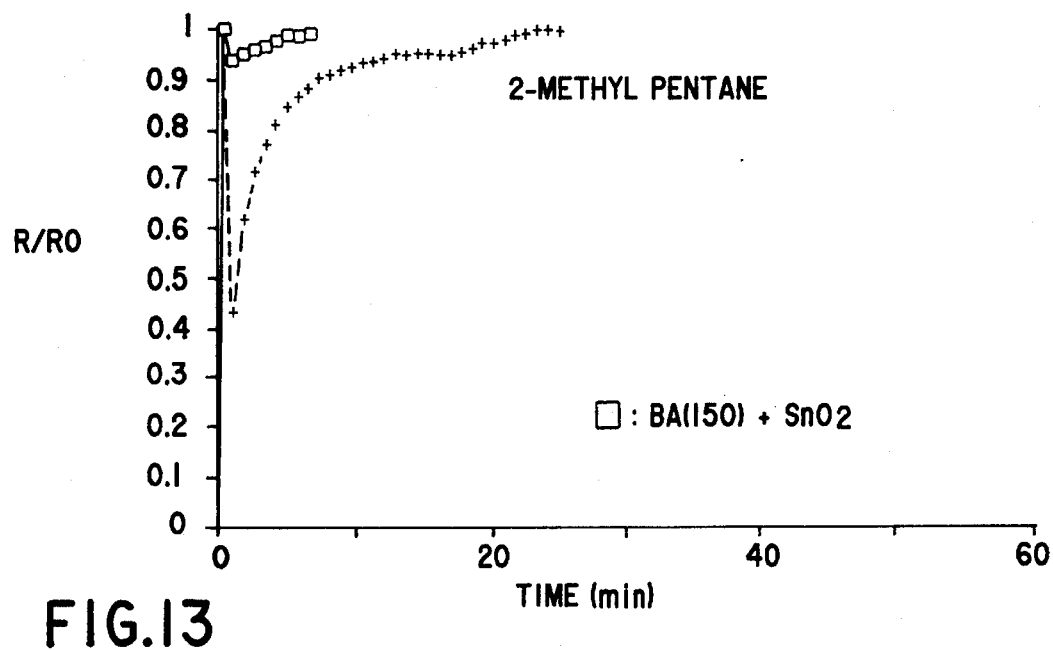
FIG. 13 is a characteristic diagram showing resistance change of the $SnO_2$ gas sensor for 2-methyl pentane.
Figure 14:
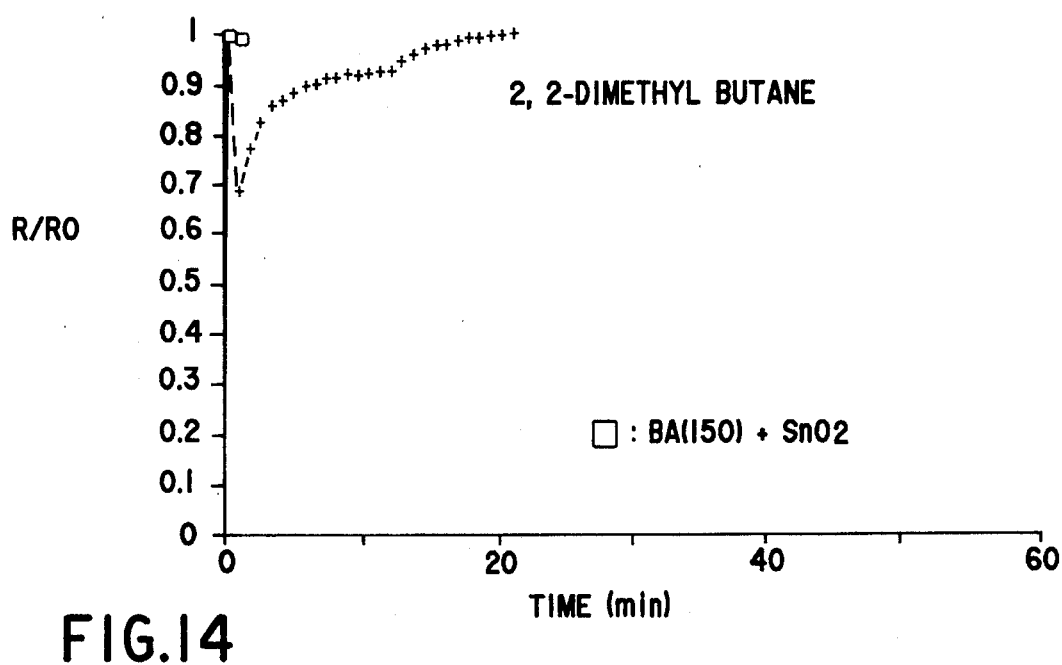
FIG. 14 is a characteristic diagram showing resistance change of the $SnO_2$ gas sensor for 2,2-dimethyl butane.

FIGS. 12–14 show the influence of the silica mask on hexane isomers. While the influence of the mask was small on normal-hexane (FIG. 12), the resistance change was decreased remarkably with the silica mask for 2-methyl pentane (that is a methyl side chain) (FIG. 13) and further decreased for 2,2-dimethyl butane having two methyl side chains (FIG. 14). It is apparent that the silica mask allows only the straight-chain isomers to be adsorbed on the $SnO_2$ surface.

Figure 15:
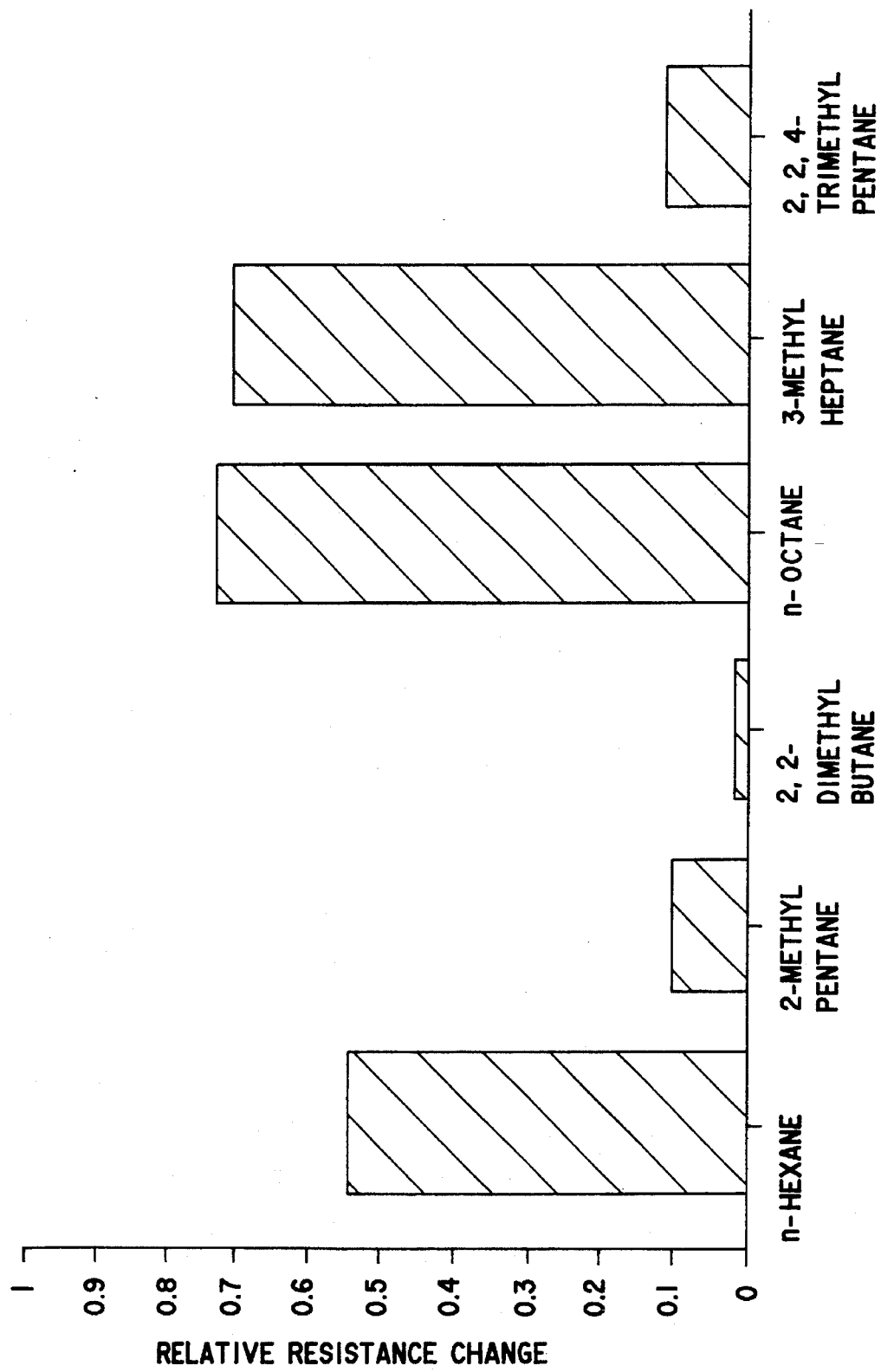
FIG. 15 is a characteristic diagram showing relative sensitivity of the $SnO_2$ gas sensor with the silica mask for normal hexane, 2-methyl pentane, 2,2-dimethyl butane, normal octane, 3-methyl heptane, and 2,2,4-trimethyl pentane (2,2,4-TMP), wherein the sensitivity is normalized by that of the gas sensor without the mask.
Figure 16:
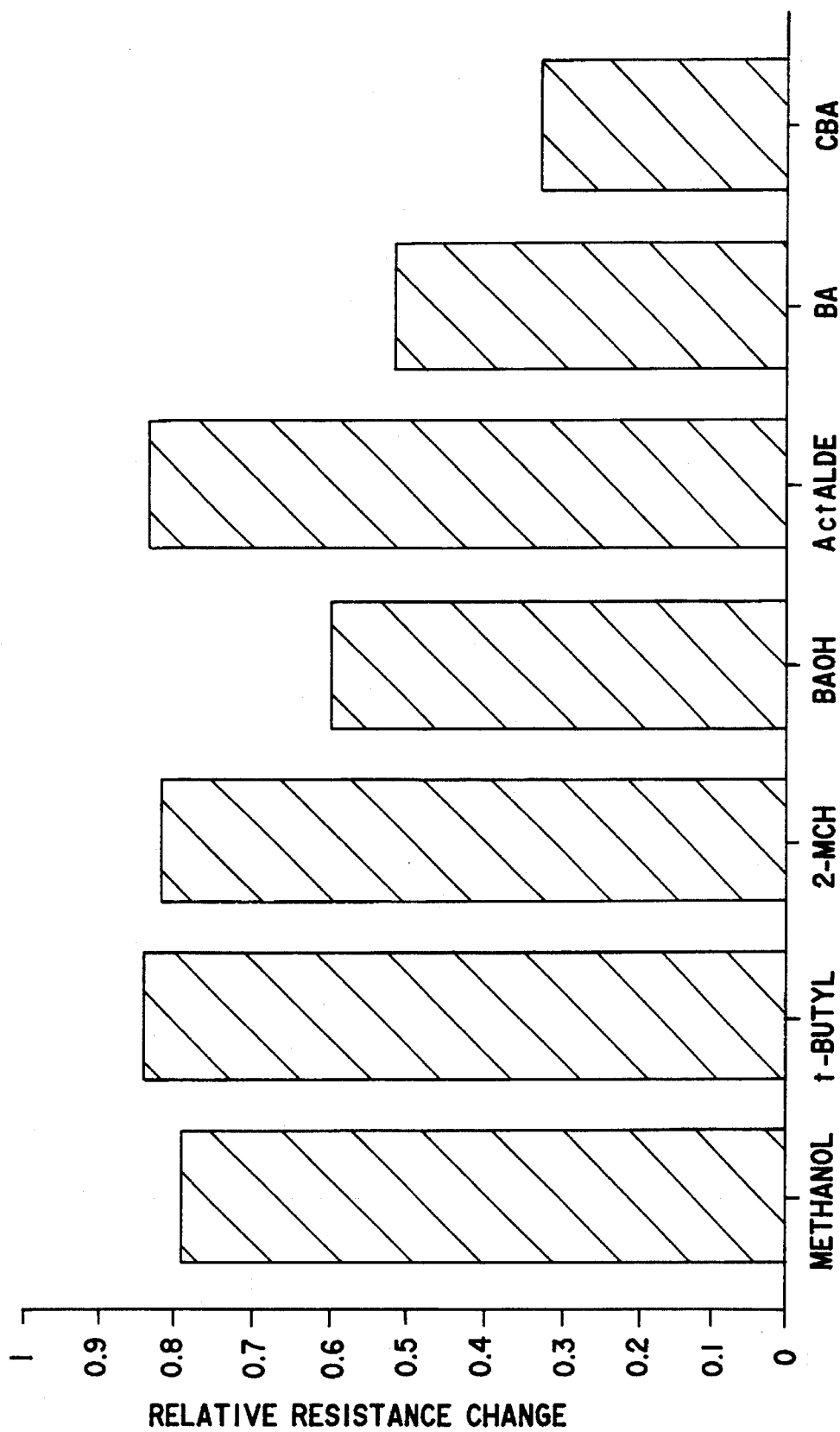
FIG. 16 is a characteristic diagram showing relative sensitivity of the $SnO_2$ gas sensor with the silica mask for methanol, tertiary butanol, 2-methyl cyclo hexanol (MCH), benzyl alcohol (BAOH), acetaldehyde, benzaldehyde (BA), and ortho-chloro benzaldehyde (CBA), wherein the sensitivity is normalized by that of the gas sensor without the mask.
Figure 17:
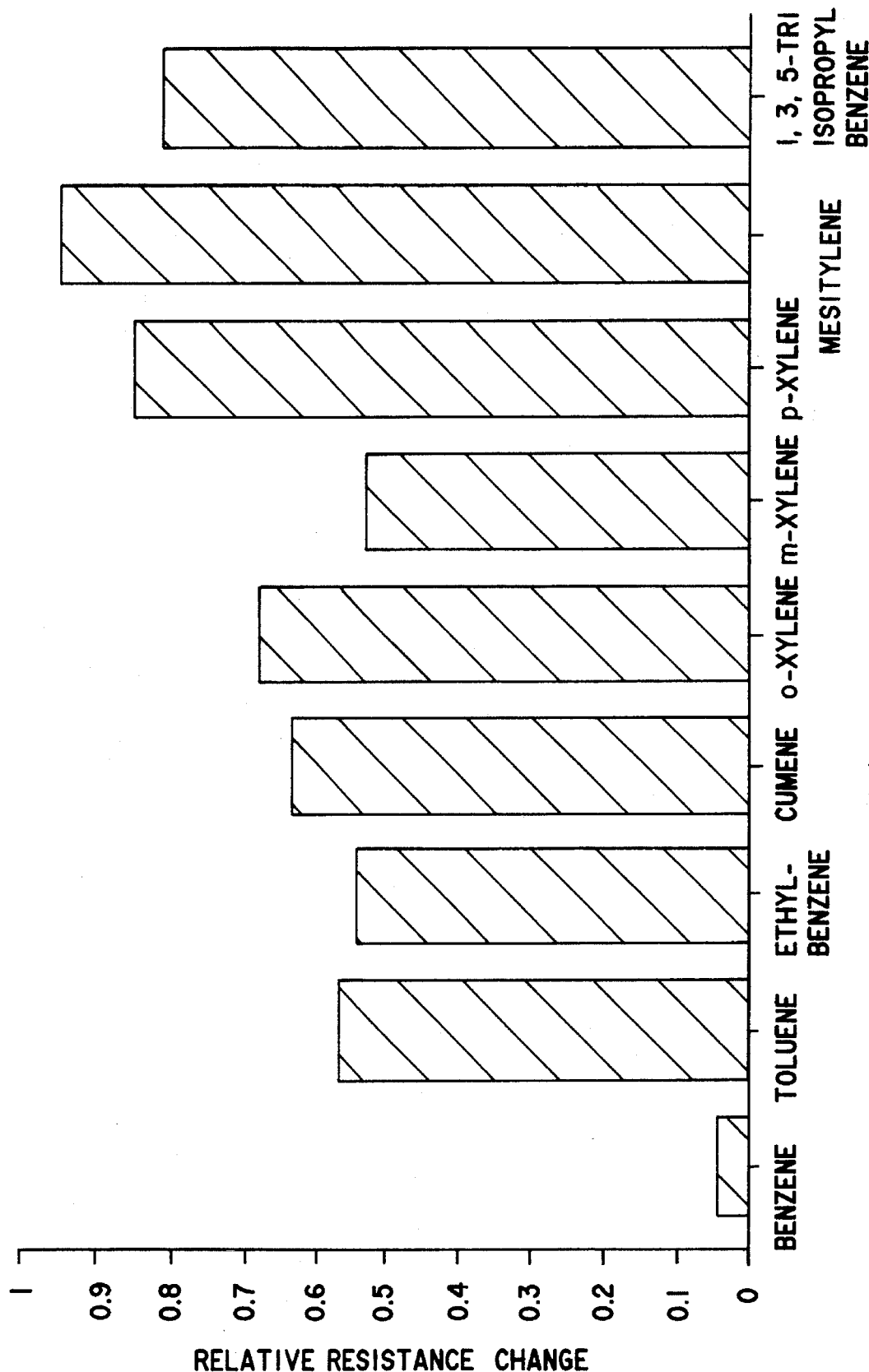

FIGS. 15–17 show the results of electric conductivity measurement for various gases. The measuring conditions are the same as those of FIGS. 9–14, and the ordinates show the resistance change by the contact with the gases. The resistance change shown in FIGS. 15–17 is normalized to that of $SnO_2$ without the silica mask. The resistance change increases with the ordinate values, and when the ordinate value is 0 the resistance change is 0.

FIG. 15 shows the resistance change for hexane isomers and octane isomers, which were already shown in FIGS. 9–14. FIG. 16 shows the influence of the silica mask on such alcohols as methanol, tertiary-butyl alcohol, 2-MCH, and benzyl alcohol, and also on such aldehydes as acetaldehyde, benzaldehyde, and ortho-chloro benzaldehyde (CBA). While the influence of the mask on various alcohols is small, the resistance change for aldehydes decreases as the molecular sizes increase. It shows shape selective adsorption of aldehydes through the silica mask.

FIG. 17 shows the influence of the silica mask on aromatic compounds. By adding alkyl groups to benzene ring, the influence of the silica mask decreased. This reveals that while the silica mask inhibits adsorption of benzene, the mask does not strongly inhibit adsorption of the derivatives of benzene added with alkyl groups.

Adsorption of benzene is planar, in which its $\pi$ electrons play a major role. The benzene ring is adsorbed parallel to the $SnO_2$ surface. In contrast to this, when the alkyl groups are added to benzene, they are activated by $\pi$ electrons and become the adsorption center. This is already known through investigations on reactivities of aromatic compounds. Therefore the inventors estimated that the alkyl groups of benzene derivatives are the adsorption center on the $SnO_2$ surface and that the benzene ring is placed opposite to the $SnO_2$ surface around the alkyl groups. This hypothesis explains the data shown in FIG. 17 in which the influence of the silica mask is small on the benzene derivatives with the alkyl groups added.

We claim:

1. A method for producing a silica mask on a metal oxide surface comprising:

adsorbing acidic molecules, selected from at least one member of the group consisting of aromatic carboxylic acids and aromatic aldehydes on a metal oxide surface on which said acidic molecules can be adsorbed, which surface is neutral or alkaline in that it comprises molecules which are capable of adsorbing said acid molecules, at a density of less than that of a monomolecular layer of the acidic molecules on the surface, whereby forming a coating of said acidic molecules on a portion, which is less than all, of said metal oxide surface, after the adsorption of said acidic molecules on said metal oxide surface, depositing molecules which are a precursor of silica on at least the portion of the metal oxide surface which does not contain said adsorbed acidic molecules, thereafter removing the acidic molecules from the metal oxide surface leaving the silica precursor molecules on a portion of the metal oxide surface, and decomposing the silica precursor molecules into silica as a mask on said metal oxide surface with gaps in said silica mask where said adsorbed acidic molecules had been.

2. A method of producing a silica mask on a metal oxide surface according to claim 1, wherein, in the substantial absence of solvent:

said acid molecules are deposited for adsorption on said metal oxide surface from a gas phase comprising said molecules; and said precursor is deposited, on said metal oxide surface having acid molecules partially adsorbed thereon, from a gas phase comprising said silica precursor.

3. A method for producing a silica mask on metal oxide surface according to claim 2, including bonding said precursor molecules of silica onto the metal oxide surface through M—O—Si bonds during their deposition, wherein M, 0, and Si represent a metal atom, an oxygen atom, and a silicon atom respectively, and including decomposing said precursor molecules of silica by reaction with water vapor.

4. A method for producing a silica mask on metal oxide surface according to claim 1, wherein said metal oxide is selected from the group consisting of $Al_2O_3$, $SnO_2$, $TiO_2$, $ZrO_2$ and MgO.

5. A method for producing a silica mask on metal oxide surface according to claim 1, wherein said precursor molecules of silica are molecules of an alkoxy silane compound.

6. A method for producing a silica mask on metal oxide surface according to claim 1, wherein said adsorbed acidic molecules are removed by reaction with ammonia or an amine compound.

7. A method as claimed in claim 1 wherein said adsorbed acidic molecules are desorbed simultaneously with decomposing of said silica precursor to silica.

* * * * *